United States Patent [19]
Andrews

[11] Patent Number: 4,644,496
[45] Date of Patent: Feb. 17, 1987

[54] APPARATUS, METHODS, AND SYSTEMS FOR COMPUTER INFORMATION TRANSFER

[75] Inventor: Barry A. Andrews, Auburn, Wash.

[73] Assignee: Iowa State University Research Foundation, Inc., Ames, Iowa

[21] Appl. No.: 457,197

[22] Filed: Jan. 11, 1983

[51] Int. Cl.$^4$ .................................... G06F 9/00
[52] U.S. Cl. ........................................ 364/900
[58] Field of Search ........................ 364/200, 900

[56] References Cited

U.S. PATENT DOCUMENTS

| | | | |
|---|---|---|---|
| 3,748,647 | 7/1973 | Ashany et al. | 340/172.5 |
| 3,749,845 | 7/1973 | Fraser | 179/15 AL |
| 4,007,450 | 2/1977 | Haibt et al. | 340/172.5 |
| 4,031,512 | 6/1977 | Faber | 340/147 R |
| 4,177,514 | 12/1979 | Rupp | 364/200 |

OTHER PUBLICATIONS

"Recursive Machines and Computing Technology", by V. M. Glushkov et al., *Information Processing 74*, North-Holland, 1974.

"Interconnection of Computer Networks", by C. A. Sunshine, *Computer Networks and Simulation*, S. Schoemaker, Ed., North Holland, 1978.

"Communication Structures for Large Networks of Microcomputers", by L. D. Wittie, *IEEE Transactions on Computers*, vol. C-30, No. 4, Apr., 1981.

"The Architecture of DDM1: A Recursively Structured Data Driven Machine", by A. L. Davis, dated Oct. 7, 1977 to appear in *Proceedings of the Fifth Annual Symposium on Computer Architecture*, Apr., 1978.

"X-Tree: A Tree Structured Multi-Processor Computer Architecture", by A. M. Despain et al., 5th Architecture Conf., Apr. 3-5, 1978 Proceedings.

"Communication in X-Tree, a Modular Multiprocessor System", by C. H. Sequin et al., ACM 78 Proceedings, Washington, D.C., Dec. 4-6, 1978.

"The ILLIAC IV Computer", by G. H. Barnes et al., *IEEE Trans. Computers*, vol. C-17, No. 8, Aug., 1968, pp. 746-757.

*An Introduction to Microcomputers*, Adam Osborne & Associates, Inc., 1976, vol. II, Ch. 5.

*Microprocessor and Digital Computer Technology*, by J. E. Oleksy et al., Prentice-Hall, 1981, pp. 90-94, 121-123, 184-191, 262-285, 326-332, 358-372.

*Modern Microprocessor System Design*: Sixteen-Bit and Bit-Slice Architecture, by D. R. McGlynn, Wiley, 1980, pp. 127-150, 177, 220-225.

*Primary Examiner*—Thomas M. Heckler
*Assistant Examiner*—John G. Mills
*Attorney, Agent, or Firm*—Senniger, Powers, Leavitt and Roedel

[57] ABSTRACT

A network of computing nodes is connected by communication channels into fully-interconnected units and groups of units. Each unit has one and only one direct connection to each other unit in a group, and any one computing node in any unit has a direct connection to at most one other unit. The nodes are suitably computing networks themselves so there can be any number of levels of recursion. In a method of routing and transferring information, each node is given an address having address portions respectively identifying its location at each level of recursion. The information is sent from that port of the sending node which has a port identification identical to the highest order address portion in the destination address which is different from the corresponding address portion of the sending computing node. Each computing node suitably has processing assemblies each having a digital processor, first and second memories, partitioning circuitry, and assembly control circuitry, communicating on a common intranodal shared bus. Each assembly is a port to an external bus. Each digital processor is able to communicate the information it generates from its first memory through the partitioning circuitry to a bus simultaneously with the partitioning circuitry also permitting access by other information to the second memory along the other bus.

9 Claims, 10 Drawing Figures

NODE 110100

APPARATUS, METHODS, AND SYSTEMS FOR COMPUTER INFORMATION TRANSFER

BACKGROUND OF THE INVENTION

The present invention relates to the field of computing networks, and methods and apparatus for routing and transferring computer information in networks. More specifically, the present invention relates to computing networks of recursively interconnected computing node arrangements, methods for accomplishing routing and transfer of computer information in the inventive networks and assemblies of apparatus for the purpose.

In the prior art it has been recognized that digital computers can be connected together into a network configuration so as to accomplish transfers of data therebetween. Parallel processing has been suggested so that a large computing problem is split into multiple tasks which can be executed at the same time. Some prior art networks involve a grid-like lattice of computers or a branching tree interconnection of computers.

Depending on application, the structure of a network should provide advantageous properties from both the hardware and software points of view, compatibility with efficient addressing and routing methods, and short path lengths between computers in the system.

It is of significant interest to the art to find new forms of computer networks having advantageous features superior to those of the prior art and to elaborate the art by discovering alternative network apparatus, methods, and systems. In addition, the advent of large scale integrated circuit technology (LSI) and very large scale integrated circuit technology (VLSI) has spurred interest in computer methods, apparatus building blocks, and systems conveniently compatible to such technologies.

SUMMARY OF THE INVENTION

In the present invention new kinds of recursive computer networks, methods for operating them, and apparatus for routing and transferring information in computing networks have been discovered.

In the invention a network of computing nodes is interconnected by a plurality of communication channels so as to be organized into units, each unit having at least three computing nodes. Each computing node in each unit is directly connected to every other computing node in the same unit by communication channels. Also, the network is organized into at least one group of units. In each group, each unit has only one direct connection to each other unit by way of the communication channels. Each group has at least three units, and any one computing node in any unit in the network has a direct connection to at most one other unit in the network. The nodes may be the same or different from one another, depending on application. The nodes can also be computing networks themselves.

Each computing node is provided with a whole number P (at least 3) of two-way communication ports. Only one less than P of the ports on each computing node are required to accomplish full interconnection of computing nodes within the unit. Consequently, the unit is left with exactly P two-way communication ports, one per computing node, useful for communications external to the unit. Now the unit is able to be regarded as a larger computing node having its own set of ports, just as do its component computing nodes. The units can be and are interconnected into groups in the same manner as computing nodes are interconnected to form each unit. Groups, in turn, are suitably interconnected to each other to form a higher order cluster in the same manner also as computing nodes are interconnected to form each unit, because at each step, or level of recursion, exactly P two-way communication ports remain for ever-higher-order external communications. This capacity for interconnection at any order of complexity in the same manner is the recursive quality of the network.

The recursive networks of the invention lend themselves to a simple addressing approach in that each computing node is given an identification in each unit (cluster of nodes), each unit is given an identification in each group (cluster of units), and each group is given an identification any or each next higher-order cluster of groups, and so on. The identifications are concatenated to form the address byte, or word, for each computing node in the network as a whole. Relatively uncomplicated routing operations are then capable of sending computer information to the destination indicated by the contents of a destination address word.

The inventive methods of routing computer information in the networks of the invention involve the steps of storing in each of the computing nodes a distinct address having address portions. The address portions include in decreasing order an address portion identifying for each computing node its unit and an address portion identifying each computing node in its unit. Also, an identification of each port of each computing node is respectively stored in each computing node. The identification of each port is identical with the computing node address portion of the address of the computing node in the same unit to which the port is connected. However, when the port is connected to a computing node in a distinct unit in the same group of units, then the identification of the port is identical with the unit address portion of the address of the computing node in the distinct unit to which the port is connected. If the port is connected to a computing node in a distinct group, then the port identification is identical with the group address portion of the computing node in the distinct group to which the port is connected, and so on for levels of recursion higher and higher in the network.

In such methods, the computer information to be transferred is provided with an associated destination address identical to an address of one of the computing nodes in the network. Then the computer information is transferred from its location in any sending one of the computing nodes having an address distinct from the destination address, by selecting the port of the sending computing node which has a port identification identical to the highest order address portion in the destination address which is different from the corresponding address portion of the sending computing node. The computer information is sent out from the port so selected into an adjacent computing node to which the port is connected by a communication channel.

Because of the remarkable recursive properties of the inventive networks, and the nodal addressing and port identification approach, the procedure for selecting the correct port for transmission from any node along the journey to the destination is found with highly advantageous economy of method.

Addressable access to the adjacent node is available in some embodiments of the routing and transfer apparatus of the invention. Where such access is utilized, an adjacent port identification aspect of the inventive methods is accomplished merely by obtaining as the adjacent port identification the lowest-order address portion in the sending node address which is different from the port identification of the port selected for sending the computer information from the sending node.

In the routing and transfer apparatus feature of the invention, inventive networks are prepared by interconnecting building blocks of the inventive apparatus. Each apparatus includes at least one processing assembly having a digital processor, first and second memories, partitioning circuitry, and assembly control circuitry, communicating with first and second buses. Each digital processor is able to communicate with its respective first memory locally so as to be able to generate digital information to be routed in the network. Also, each digital processor is able to communicate through its respective partitioning circuitry with its respective second memory. Each digital processor is able to communicate the information it generates through the partitioning circuitry to the second bus simultaneously with the partitioning circuitry also permitting access to the second memory along the first bus to permit digital information also to be communicated along the first bus to the second memory. The partitioning circuitry is operated by grant inputs at least from the assembly control circuitry in response to requests assertable from the first bus and each digital processor.

Unlike a prior art approach wherein each digital processor communicates with other processors exclusively through one or more terminal units, the inventive routing and transfer apparatus permits adjacent processors to reach and transfer directly into local shared memory, the second memory, while the local digital processor is transferring directly into the shared memory associated with another digital processor in another identical processing assembly apparatus. The arrangement of each processor, memories, partitioning circuitry, and assembly control circuitry which permits this, is highly flexible in that the grant inputs to the partitioning circuitry dynamically rearrange the configuration as operations proceed. In this way transfers to first bus and second bus, and direct operations on the second memory by the local digital processor are made possible. By using more than one bus, highly advantageous flexibility is obtained in interconnecting many of the processing assemblies together.

When three or more such processing assembly apparatus building blocks are connected together with accompanying bus control circuitry, computing nodes are formed. Each node has the first bus of each assembly apparatus being a distinct nodal external bus for communications externally, and the second bus of each assembly apparatus being joined and utilized as one common intranodal bus. When two such processing assembly apparatus building blocks are connected together with accompanying bus control circuitry, assembly-pairs are formed. Each assembly-pair has the first bus of each assembly apparatus joined and utilized so as to join the processing assemblies. The second buses are respectively available. Interestingly, the networks of the invention can in most cases be viewed as interconnected nodes or as configurations of assembly-pairs.

The networks of the invention are useful by way of example in a computing system of the multiple-instruction stream, multiple data stream (MIMD) type. It is contemplated that the processing assemblies, and even computing nodes be provided on LSI (and even networks on VLSI chips) and interconnected in the recursive architecture of the inventive networks. As such, the chips are suitably combined together at a single location to form a computer of small size but huge computing capacity. The resulting relatively inexpensive computational facility is applicable in solving data processing problems in distributed or single data bases and complex mathematical problems such as differential equations in multiple dimensions. Fields of application include seismology, cosmology, aerodynamics, meteorology, nuclear physics, signal processing, tomography, pattern analysis, artificial intelligence, visual processing, speech analysis, speech generation, and complex system control and simulation.

DETAILED DESCRIPTION OF THE DRAWING

Figure 1:
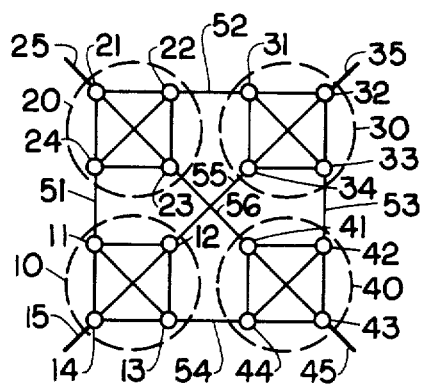
FIG. 1 depicts an inventive second-order network (group) of computing nodes.

FIG. 1 shows inventive network 1 having four computing units 10, 20, 30, and 40. Each of the units has four computing nodes. Unit 10 includes computing nodes 11, 12, 13, and 14. Unit 20 has computing nodes 21, 22, 23, and 24. Unit 30 includes computing nodes 31, 32, 33, and 34. Unit 40 has computing nodes 41, 42, 43, and 44.

Each node includes at least one digital processing unit for executing instructions according to a program and using space in at least one storage device or memory. Each node has interfaces called ports for suitably two-way communication from node to node. In the network of FIG. 1 each node is provided with ports equal in number to the number of nodes in each unit, being four in this case. Each node, for instance, is suitably a PDP-11 or other minicomputer communicating to the other nodes from its ports along communication links in accordance with the EIA RS-232 standard, where serial data transfer is contemplated, or along buses for parallel data transfer as the skilled worker elects.

Each node is also suitably implemented as a microcomputer with the appropriate number of two-way communication ports, using technique analogous to the minicomputer approach. A discussion of such known nodes is not undertaken since they are familiar to the skilled worker in the field of computer network design. However, an inventive node providing interesting features is described in connection with FIGS. 8 and 9. In any event, the detail of each node is omitted in FIGS. 1-5 to clarify the principles and manner of operation of the inventive networks without sacrificing completeness in the disclosure thereof.

In unit 10 six two-way coxmunication channels interconnect nodes 11, 12, 13, and 14 as intraunit connections, represented by the six lines respectively joining node pairs 11,12; 11,13; 11,14; 12,13; 12,14; and 13,14. Each of the units 20, 30, and 40 also each has six two-way communication channels correspondingly interconnecting the nodes within as intraunit connections.

Network 1 organizes the units 10, 20, 30, and 40 in a manner of interconnection between units analogous to the manner of interconnection of computing nodes within each unit. Thus, each of the units is interconnected with every other unit by means of six two-way communication channels 51, 52, 53, 54, 55 and 56, called interunit connections. Unit pair 10,20 is connected by channel 51; 10,30 by channel 55; 10,40 by channel 54; 20,30 by channel 52; 20,40 by channel 56; and 30,40 by channel 53.

Each node in network 1 has a two-way communication port for each two-way communication channel connecting to it. For instance, node 12 has four two-way communication ports (bidirectional ports) for the four two-way communication channels connecting to it from nodes 11,13,14, and 34. As another example node 44 has four two-way communication ports for the four two-way communication channels connecting to it from nodes 41, 42, 43, and 13. By contrast, node 43 has four two-way communication ports and has three two-way communication channels connecting to it from nodes 41, 42, and 44, one of the ports being free for connection to an additional two-way communication channel 45.

In an interesting feature of network 1, each unit 10, 20, 30, and 40 regarded as a whole has four ports available for communication outside itself, just as does each four-port node. For instance, unit 10 has four ports available for communication along channels 15, 51, 55, and 54. Unit 20 has four ports available for communication along channels 51, 25, 52, and 56. Unit 30 has four ports available for communication along channels 52, 35, 53, and 55. Unit 40 has four ports available for communication along channels 56, 53, 45, and 54. Thus, each unit 10, 20, 30, and 40 can be regarded as a four-port computing device analogous to each four-port computing node within it.

Further regarding network 1 itself as a whole, it is additionally observed that network 1 also has precisely four ports available for communication outside itself along two-way communication channels 15, 25, 35, and 45. Accordingly, network 1 is itself a four-port computing device analogous to each four-port computing unit and each four-port computing node within it. This characteristic of network 1 is called recursion. Each unit 10, 20, 30, 40 has the same whole number being four of computing nodes in itself. The network 1 has the same whole number being four of units in itself as there are computing nodes in each unit. Each unit has each node therein being directly connected to every other node in the same unit by respective two-way communication channels from each node to every other node in the same unit. At the same time, each unit has one and only one direct connection (two-way communication channel with no intervening node) to each other unit by way of the two-way communication channels, with any one computer in each unit having at most one interunit direct connection like 51,52,53,54,55,56 of FIG. 1. Each node is constructed identically. Moreover, network 1 can be, and in embodiments of the invention is, connected into more complex networks having the same recursive organization as network 1 in the same manner of connection as any one or each four-port node or four-port unit in network 1 is connected into network 1 itself. When network 1 is connected together with other networks identical to itself in the manner that units 10,20,30, and 40 are connected together to form network 1, then a network of the next higher level of recursion, or next higher order, is formed as shown in FIG. 3, discussed later herein.

Figure 2:
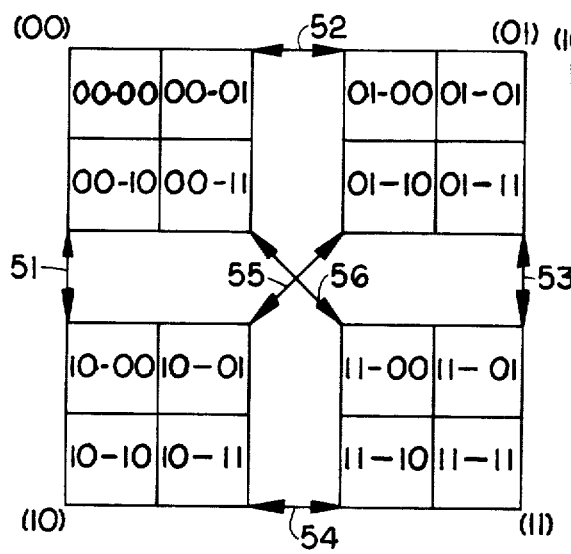
FIG. 2 is a node addressing diagram of the inventive network of FIG. 1.

An addressing scheme made possible by network 1 is particularly interesting. As shown in FIG. 2, each node within a unit can be identified by as few as two bits 00, 01, 10, and 11 for four nodes. In turn, each unit for addressing purposes is identified by as few as two higher-order bits 00, 01, 10, and 11 for the four units. All sixteen nodes in network 1 are accordingly identified by four bits, the two higher-order unit bits and the two lower-order node bits. By virtue of the particular organization of the network as shown in FIG. 1, the four bits not only merely distinctly identify each of sixteen nodes regardless of network organization but also identify which unit the node is in, and where the node is in its unit. The inventive organization of network not only permits the four bits to distinctly "name" each node but also to provide the location information on each node for data routing purposes between nodes in the network.

For example, node 34 of FIG. 1 has address 0110 as shown in FIG. 2. The address 0110 is a concatenation of the address 01 of unit 30 and the address 10 of node 0110 in unit 01. In other words, computing node 0110 is in the upper-right 01 unit and at the nodal intraunit position at lower-left 10. Corresponding examples can be described for each of the sixteen nodes in network 1. In each case 00 is an upper-left position, 01 is an upper-right position, 10 is lower-left, and 11 is lower-right. Because of the regularity of the network due to its geometrically recursive topology, the address word for each node not only identifies each node distinctly but also contains the information cues needed to locate the node in the network. Accordingly, an advantageously simple, and consequently fast, routing program is made possible, described hereinafter.

Figure 3:
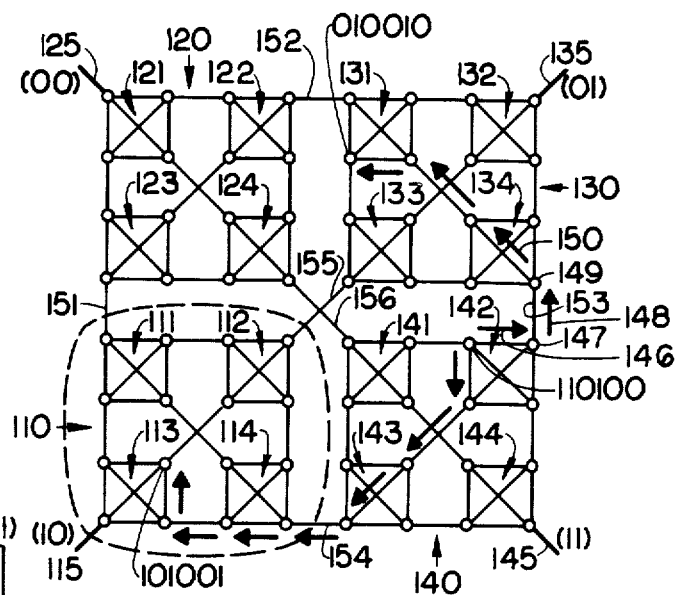
FIG. 3 depicts a third-order network according to the invention including four groups having four units of four nodes each. Two examples of routing of blocks of data in the network are shown using path arrows.

In FIG. 3, four groups, or networks, of the same type as network 1 and numbered 110, 120, 130, and 140 are interconnected into network 100 in the precisely analogous manner to the way units 10, 20, 30, and 40 are interconnected into network 1 of FIG. 1. The resulting network 100 of FIG. 3 has 4 groups of 4 units of 4 nodes apiece for a total of 64 nodes in all.

The third-order inventive network of FIG. 3, network 100, is composed of four groups 110,120,130, and 140 which are said to be topologically equivalent in that their wiring, or interconnection, diagrams are identical in FIG. 3. Each group has one and only one direct connection by a two-way communication channel to each other group by means of channels 151,152,153,154,155, and 156. Group 110 has units 111,112,113,114; group 120 has units 121,122,123,124; group 130 has units 131,132,133,134; and group 140 has units 141,142,143, 144. In each group the units are all topologically equivalent to one another in that their wiring diagrams are identical.

In network 100 there are exactly four two-way communication ports available for communication outside network 100 along communication channels 115, 125, 135, and 145. Network 100 can accordingly be interconnected into networks of even higher order, or used in substitution for one of its own nodes, units or groups. The addressing scheme is such that group 120 is given binary address 00 (upper-left); group 130 is given binary address 01 (upper-right); group 110 is given binary address 10 (lower-left); and group 140 has address 11 (lower-right). The group address is concatenated as high-order bits to the address which each node has in each group as described in connection with FIG. 1, so that a six-bit address is formed for each of the 64 nodes in the network of FIG. 3.

For example the computing node having address 110100 in FIG. 3 has group address 11 (lower-right), unit address 01 (upper-right in group 11), and node address 00 (upper-left in unit 01). Two other nodes 101001 and 010010 are indicated on FIG. 3 as examples showing how the address also signifies location in the network. It is observed that in general where the number P is 4 of groups in the network, and the order of recursion of the network is R, then the number of bits in the address word is 2R. For instance in FIG. 3 the order of recursion R is 3 (third-order network) and the number of bits in the address word is 6. In FIG. 1 the order of recursion is 2 and the number of bits in the address word is 4.

In FIG. 3 each unit has one and only one direct connection to each other unit in the same group, i.e. the same second-order portion of the network. Any one node in each unit of the network has at most one interunit direct connection, at most one intergroup direct connection, and in general at most one direct connection connecting portions of the network at the same level of recursion. Any one computing node in any one unit in the whole network 100 has a direct connection to at most one other unit in the network.

Figure 4:
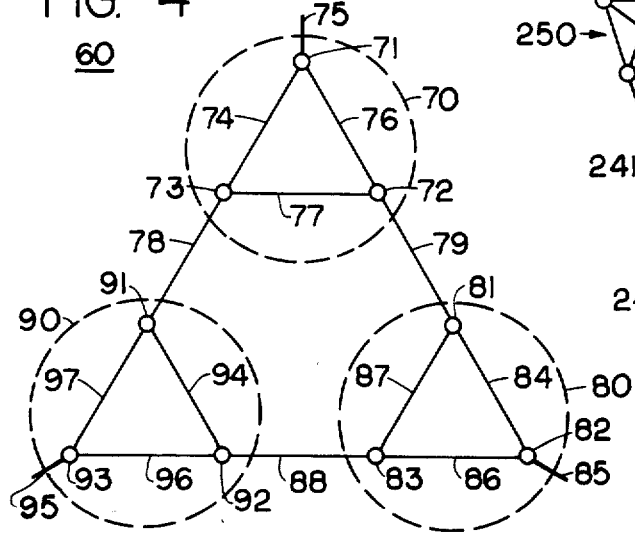
FIG. 4 depicts a second-order network according to the invention including three units having three nodes apiece.

The inventive computer networks take many forms. For example when the number P of nodes per unit in a second-order network is three, network 60 of FIG. 4 is the result. In FIG. 4 three units 70, 80, and 90 each include three nodes fully interconnected in triangular wiring diagrams by the two-way communication channels. Three ports per node suffice to provide each node with sufficient two-way communication ports for interconnection in network 60. In unit 70 computing nodes 71, 72, 73 are interconnected by channels 76,77,74. In unit 80 nodes 81, 82, 83 are interconnected by channels 84,86,87. In unit 90 nodes 91, 92, 93 are interconnected by channels 94,96,97. Interunit communication channels 79, 78, and 88 are provided so that each unit is directly connected to every other unit but that each node in each unit has at most one interunit direct connection. In the recursive aspect of the network 60, when all nodes are provided with exactly the same number P being 3 of two-way communication ports, there are three ports 75, 85, and 95 left over for interconnection of network 60 into higher-order networks. No two-way communication links cross over one another in the diagram of FIG. 4 providing a potentially advantageous feature when deposition on a planar substrate in very-large-scale-integration (VLSI) technology is undertaken. The number of bits per address word remains at twice the network level of recursion R.

Figure 5:
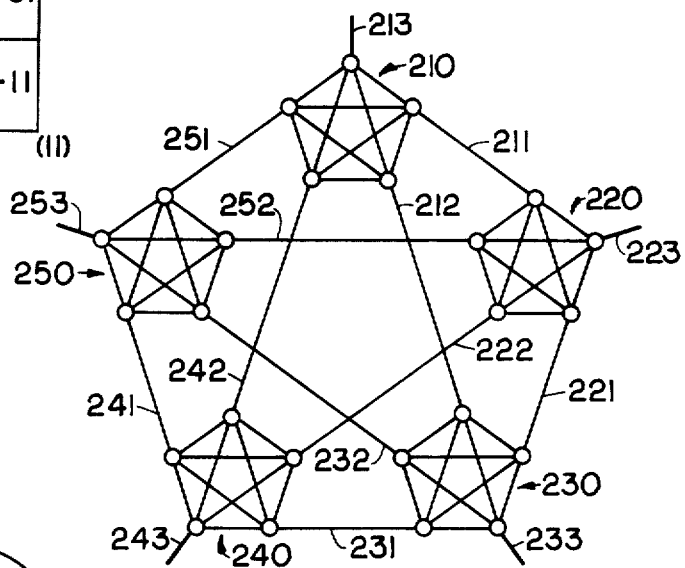
FIG. 5 depicts a second-order network according to the invention including five units having five nodes apiece.

FIG. 5 shows a second-order network 200 of the invention in which the whole number P of nodes per unit is five, and there are five fully interconnected pentagon units 210,220,230,240,250. There are ten interunit communication channels (P×(P−1)/2). Units 210,220 have interunit communication channel 211; 210,230 have 212; 220,230 have 221; 220,240 have 222; 230,240 have 231; 230,250 have 232; 240,250 have 241; 240,210 have 242; 250,210 have 251; and 250,220 have 252. Each node (P×P=25 nodes) is provided with five two-way communication ports and each unit has a free port for connection to optional two-way communication channels 213,223,233,243,253 thereby permitting higher orders of recursion. The number of bits per address word now is three times the recursion number R, since three bits are needed to identify each of five nodes per unit, and five units in network 200. Since three bits can identify up to eight nodes per unit (P=8), the same address word length can be used when the number of nodes per unit is eight and the nodes are connected in fully interconnected octagons with 8×7/2 or 28 interunit communication channels, not shown. At all numbers P of nodes per unit and levels of recursion R, the networks of the invention can be laid out in a manner compatible with printed circuit board construction and even VLSI technique due to the substantially planar arrangement.

In the present disclosure, a recursive network of the type being disclosed is called "symmetrical" if every group is topologically equivalent to every other group in the network, every subgroup is topologically equivalent to every other subgroup in the network, and in general when every portion of the network at the same level of recursion is topologically equivalent to every other portion of the network at that level of recursion. The networks of FIGS. 1, 3, 4, and 5 are all symmetrical.

A recursive network of the type being disclosed is called "assymetrical" if it is not symmetrical. An example of an assymetrical network (not shown) is a network as shown in FIG. 3 having all but one node being identical, the last node being the network of FIG. 1 substituted at one nodal location in FIG. 3. A second example of an assymetrical network (not shown) is a network as shown in FIG. 1 having identical nodes except for units of the type of unit 111 of FIG. 3 being substituted for FIG. 1 nodes 23,34,41, and 12. In this second example, "symmetry" is absent as the term is used herein notwithstanding that it can be said from a geometric point of view that the assymetrical network can be divided into halves which are mirror-images of each other. Assymetrical networks have contemplated usefulness in situations including those in which it is desired to concentrate computing power at some location to an additional degree because of the nature of the computational problem to be solved.

A symmetrical network having P nodes per unit and level of recursion R is denominated a PSR network. The FIG. 1 network 1 is 4S2 because it has four nodes per unit and is second order. FIG. 3 shows a 4S3 network; FIG. 4 a 3S2; and FIG. 5 a 5S2. Each unit of a PSR network is a PS1 network relative to its nodes, and each node may be a network itself. Each group is a PS2 network. If the nodes are networks, they are described after a colon (:). For example, a PS2 network is equivalent to a PS1:PS1 network, which is a unit of nodes which are units of nodes themselves. In general, $PSR_1:PSR_2$ is equivalent to $PS(R_1+R_2)$. A P-port node is a PSO (zero-order) network relative to itself. A "cluster" of PSR networks is defined to be a PS(R+1) network.

The number of nodes N in a PSR network is $P^R$. The number of communications channels L internal to a PSR network is $\frac{1}{2}(P^{R+1}-P)$. The largest minimum distance M required for a data block to traverse in travelling between any two nodes in the network, expressed as the number of communication channels to travel along, is $2^R-1$. The total number of communications channels T is the internal channels L plus the external channels being P in number.

It is to be understood that the hereinabove notation is not meant to suggest that only symmetric networks are within the inventive scope, but instead the notation assists in referring to some of the embodiments of the inventive networks.

The average distance between nodes in a recursive architecture is of considerable importance if random traversals are frequently attempted. This can be the case, for instance, in a multiple computer system which uses communication channels for interprocessor synchronization and for access to a distributed data base.

The average path length in several symmetrical recursive (PSR) networks of the invention has been computed. The results of the computations, as well as of the equations for number of nodes N, total number of communications channels T, and largest minimum distance M, are summarized in Table I. Two values are given for the average path length. AVE1 includes a zero-length traversal from each node in a structure to itself. AVE2 does not include such zero-length traversals.

Average path length computations including zero-length traversals have been performed for a tree-like computer network of the prior art known as X-TREE. Therefore, the table column AVE1 is used to compare the selected PSR networks with X-TREE. The comparison is shown in Table II.

In Table II, the N column has entries for the numbers of nodes in the computer network. The 3SR, 4SR, 5SR, and 8SR columns have entries for the average path length AVE1 of Table I rounded to the first decimal place corresponding to the number of nodes N. The X-TREE column also has average path length entries for the so-called fully-ringed X-TREE which utilizes nodes having five ports each.

TABLE I

| P | R | N | T | M | AVE1 | AVE2 |
|---|---|---|---|---|------|------|
| 3 | 2 | 9 | 15 | 3 | 1.78 | 2.00 |
| 3 | 3 | 27 | 42 | 7 | 3.93 | 4.08 |
| 3 | 4 | 81 | 123 | 15 | 8.20 | 8.30 |
| 4 | 2 | 16 | 34 | 3 | 2.06 | 2.20 |
| 4 | 3 | 64 | 130 | 7 | 4.64 | 4.71 |
| 4 | 4 | 256 | 514 | 15 | 9.78 | 9.82 |
| 5 | 2 | 25 | 65 | 3 | 2.24 | 2.33 |
| 5 | 3 | 125 | 315 | 7 | 5.09 | 5.13 |
| 5 | 4 | 625 | 1565 | 15 | 10.78 | 10.80 |
| 8 | 2 | 64 | 260 | 3 | 2.52 | 2.56 |
| 8 | 3 | 512 | 2052 | 7 | 5.78 | 5.79 |

TABLE II

| N | 3SR | X-TREE | 4SR | 5SR | 8SR |
|---|-----|--------|-----|-----|-----|
| 3 | 1.0 | 1.0 | | | |
| 4 | | | 1.0 | | |
| 5 | | | | 1.0 | |
| 7 | | 1.5 | | | |
| 8 | | | | | 1.0 |
| 9 | 1.8 | | | | |
| 15 | | 2.1 | | | |
| 16 | | | 2.1 | | |
| 25 | | | | 2.2 | |
| 27 | 3.9 | | | | |
| 31 | | 3.1 | | | |
| 63 | | 4.3 | | | |
| 64 | | | 4.6 | | 2.6 |
| 81 | 8.2 | | | | |
| 125 | | | | 5.1 | |
| 127 | | 5.8 | | | |
| 255 | | 7.5 | | | |
| 256 | | | 9.8 | | |
| 511 | | unav'b'l | | | |
| 512 | | | | | 5.8 |
| 625 | | | | 10.8 | |

The recursive and geometrical properties of the inventive networks allow arbitrarily complex multiple-computer structures to be traversed from node to node, using a very simple routing technique presented hereinafter. In a PSR network, or in a symmetrical portion of a network, four parameters are required for network traversal. These are 1. Source address
2. Destination address
3. Number of ports per node (P)
4. Level of recursion (R)

The first two parameters--the addresses of the source and destination nodes, use a recursively-ordered addressing scheme over the full network. The position of a node can be determined from its address, and the node can use this address to determine the addresses of other nodes connected to its communications ports. Thus, the addressing scheme of the preferred embodiment is fixed and global, providing each node and its communications ports with unique identifications, which are known to the node and its neighbors.

The network addressing scheme in one approach uses base P numbers to identify the nodes, and to enumerate the communications ports. A node address has R digits, one digit for each level of recursion. A digit describes the position of a node in a unit, the position of the unit in a group, the position of each group in the next higher-order level, and so forth.

The ports of each node are identified by conceptually labelling them in a consistent fashion, so that all nodes have ports identified by the identical scheme. Thus, it is to be emphasized that the network addressing scheme not only involves providing addresses with location meanings to every node but also identifying each port of each node according to the scheme. The port addressing scheme is provided as information in each node so that a routing operation identical for all the nodes can be executed at each node.

Address word portions are binary-coded to represent base-P numbers, so that when P=4, for example, the ports of each node are identified by the coded representations 00, 01, 10, and 11. P nodes in a unit are arranged to form a fully interconnected network, e.g. 4S1. Each position in the pattern of the unit is numbered in a manner corresponding to the port identifications. Thus, there are P nodes arranged in a geometric structure, as the vertices of a polygon or polyhedron. When P is 4, for instance, the geometric structure is a tetrahedron and when laid out on a plane is the topologically equivalent circuit of a square with four vertices fully interconnected. Each unit resembles topologically the outline of a tetrahedron with a node at each vertex and a communication channel for each edge. Each group is also topologically tetrahedral, with a unit at each vertex and a communication channel for each edge. Accordingly, the network of FIG. 3 is, like that of FIG. 1, recursively topologically tetrahedral.

Figure 7:
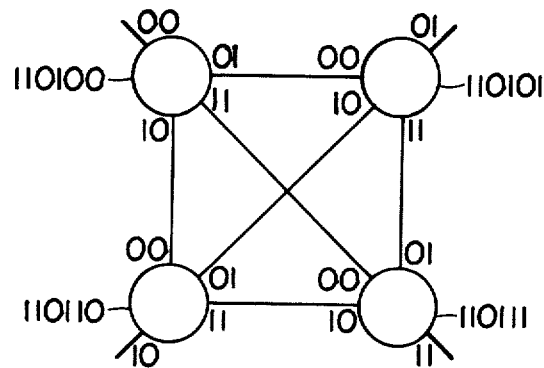
FIG. 7 depicts a port identification scheme for each of four nodes in a unit in the network of FIG. 3.

FIG. 7 shows a unit 142 of four nodes 110100, 110101, 110110, and 110111 from FIG. 3 having the ports of each node identified by the coded representations 00, 01, 10, and 11 just next to the external communication channels connected to each node. For example, port 00 of node 110100 is the port to which unit 141 of FIG. 3 is connected; port 01 is the port to which node 110101 is connected; port 10 is the port to which node 110110 is connected; and port 11 is the port to which node 110111 is connected. Similar port designations are provided for illustration purposes next to each of the other nodes in corresponding locations. The four nodes in unit 142 are arranged to form a fully interconnected configuration of the 4S1 type within a larger 4S3 network.

In unit 142, node 110100 is in the 00 (upper-left) position as indicated in the rightmost 00 bit-pair in the node address 110100 itself. Similarly, node 110101 is in the 01 position, node 110110 is in the 10 position, and node 110111 is in the 11 position in unit 142.

In the connection strategy of the preferred embodiment, as illustrated in FIG. 7, the 01 port of the node in the 00 position (i.e. node 110100) is connected to the 00 port of the node in the 01 position (i.e. node 110101). The 10 port of the 00 node is connected to the 00 port of the 10 node. The 11 port of the 00 node is connected to the 00 port of the 11 node. The 10 port of the 01 node is connected to the 01 port of the 10 node. The 11 port of the 01 node is connected to the 01 port of the 11 node. The 10 port of the 11 node is connected to the 11 port of the 10 node.

Because the structure is fully interconnected, all of the ports of the nodes are connected together so that in general the X port of the node in the Y position connects by a communication channel to the Y port of the node in the X position. As a consequence of this strategy, the P left-over ports in each unit of nodes correspond in their port identifications to the position of the nodes in the unit where they are found. For example, the 00 node has an unconnected 00 port, the 10 node has an unconnected 10 port, the 01 node has an unconnected 01 port, and the 11 node has an unconnected 11 port in an isolated 4S1 unit. The unit is then logically equivalent to a single node not only conceptually but also in its port identifications of the leftover ports.

Thus structures of the invention can be connected to each other, or they can be expanded to any size, with no changes in the addressing assignments of the nodes, units, or groups at any level of recursion. As each new level of recursion is implemented, an extra address word portion (pair of bits when P is 4) is added to, or concatenated with, the high-order portion of each node address word, to identify the new level of recursion of which it is a part.

Since the address of each node can be, and is, stored in the respective node, the only information which for routing purposes need be provided with the data which is being transferred from one node to another is the destination node address. Then each node when a block of data is received uses a routing method (implemented in hardware, firmware, or software) now described, in order to determine whether the data block is now at its destination or, if not, which port the data block should be sent from in exiting the node. Because of the recursive geometry of the inventive networks and the manner above-described for identifying, designating, or labelling the ports of each node, it turns out that the routing algorithm is advantageously uncomplicated.

The routing technique is based on the principle that the port that is selected to transfer the data block toward the destination is identical to that highest-order address portion in the destination address which is different from the corresponding address portion of the address of the node from which the transfer is to be made. If the destination address is identical to the node address, then the data block has reached its destination.

Figure 6A:
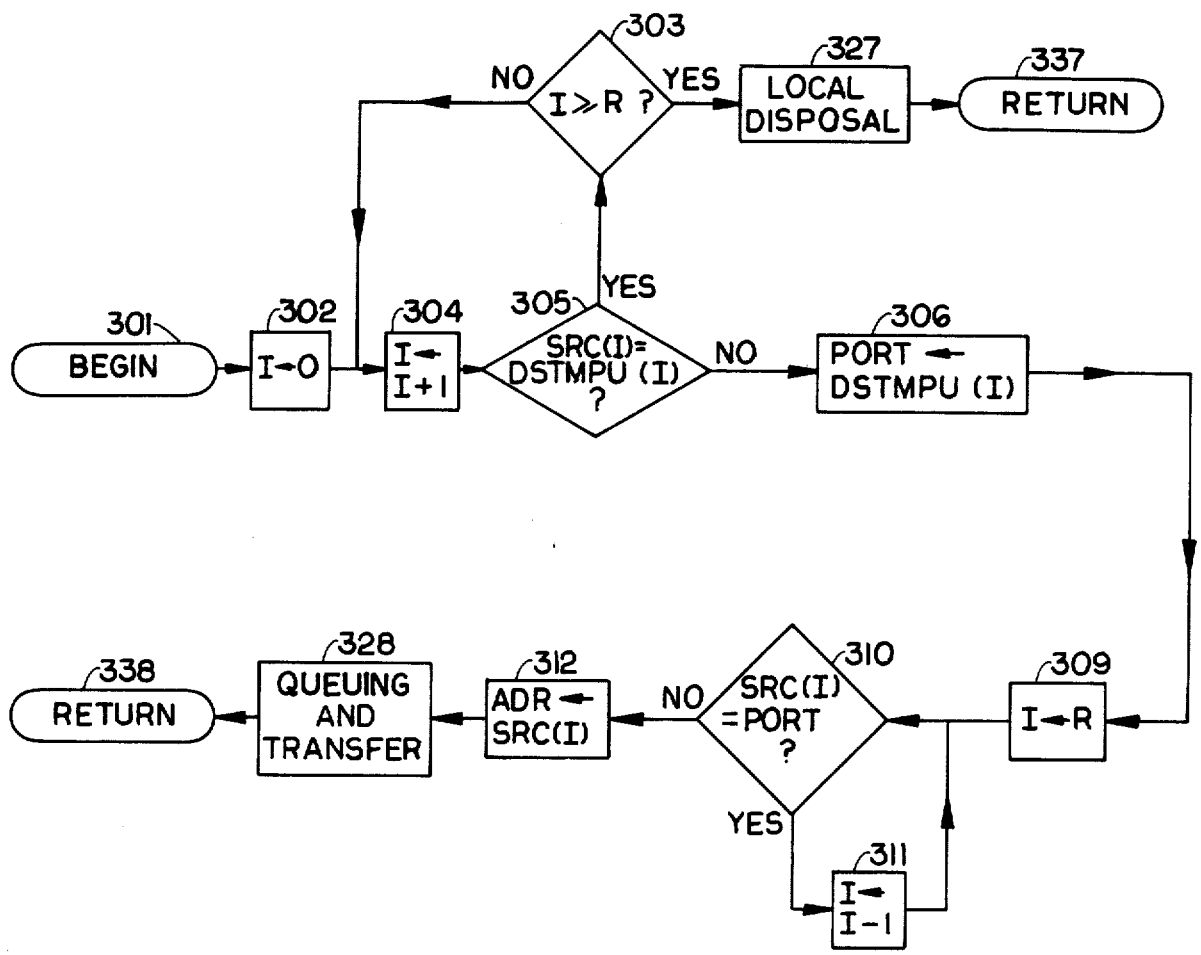
FIG. 6A is a flowchart illustrating an inventive method of operation of the network of FIG. 3.
Figure 6B:
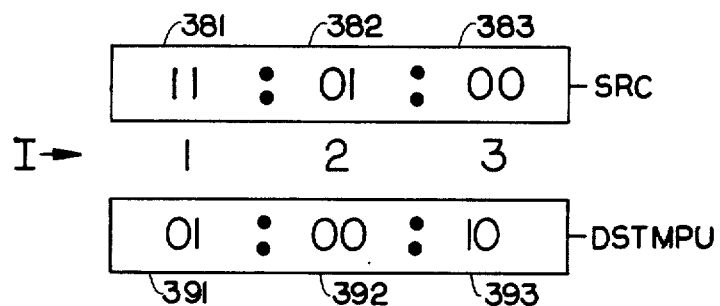
FIG. 6B illustrates address bits in a source address and a destination address to facilitate description of the FIG. 6A operations.

In FIG. 6B, a first example is shown wherein the address SRC is the computing node 110100 of FIG. 3. Address SRC has high-order address portion 381 having the two bits 11 designating the lower-right group of 16 nodes. The next lower-order address portion 382 has contents 01 designating the upper-right subgroup (here a unit of 4) in the 11 group. The lowest-order address portion 383 has contents 00 designating the upper-left node in the 01 subgroup of the 11 group. In an interesting correspondence between the shorthand notation and the address word layout, the 4S3 network of FIG. 3 is in the shorthand also a 4S1:4S1:4S1 network and each of the three address word portions 381,382,383 designates the position or location at each level of recursion in this third-order network.

As the data block transferred makes its way through the network 100 to its destination DST, the SRC nodal address successively becomes the address of each node being transited.

The destination address DST in this example is given as the node 010010. The destination address word here has the three address portions 391 (high-order), 392 (next-lower-order) and 393 (lowest-order) respectively designating the upper-right 01 group, the upper-left 00 subgroup therein and the lower-left 10 node therein, as shown on FIG. 3.

Now referring also to explanatory Table III, the three bit pairs for node address SRC are listed vertically from highest order to lowest. The columns from left to right show the addresses of the nodes through which the data block passes on

TABLE III

| S | | 11 | 11 | 01 | 01 | 01 | 01 | | 01 | | D |
|---|---|----|----|----|----|----|----|---|----|---|---|
| R | { | 01 | 01 | 11 | 11 | 00 | 00 | } | 00 | } | S |
| C | | 00 | 01 | 11 | 00 | 11 | 10 | | 10 | | T |
| PORT | | 01 | 01 | 00 | 00 | 10 | RCVD | | — | | |
| ADR | | 00 | 11 | 11 | 11 | 11 | — | | — | | |

TABLE IV

| S | | 11 | 11 | 11 11 | 10 | 10 | 10 | 10 | | 10 | | D |
|---|---|----|----|-------|----|----|----|----|---|----|---|---|
| R | { | 01 | 01 | 10 10 | 11 | 11 | 10 | 10 | } | 10 | } | S |
| C | | 00 | 10 | 01 10 | 11 | 10 | 11 | 01 | | 01 | | T |
| PORT | | 10 | 10 | 10 10 | 10 | 10 | 01 | RCVD | | — | | |
| ADR | | 00 | 01 | 01 11 | 11 | 11 | 11 | — | | — | | | its way to destination 010010. The bottom row of Table III labelled PORT shows each identification of the output port determined by the routing technique executed in the node identified in the respective column. In the leftmost first column, SRC differs from DST in the highest-order bit pair, so the highest-order bit pair 01 is selected from DST and placed and tabulated in the leftmost first column of the row marked PORT. This tells the node 110100 to send the data block out its 01 port, meaning rightward on FIG. 3 as shown by arrow 146. The data block arrives at the next node 147 to the right. Node 147 has its own SRC node address stored in itself, which due to the global addressing scheme is known a priori and is 110101, as tabulated in the SRC column at the second column from left in Table III. Node 147 executes the routing operation and it is seen that destination address DST still differs from SRC in the highest-order bit pair 01. Accordingly, 01 is tabulated in the second column entry of PORT in Table III, and Node 147 (110101) transfers the data block out of its own port designated 01. Because this node is at the upper-right corner of its unit 142, the 01 port is the port that is free for interunit communication along channel 153 as shown by the up-arrow 148. Now the data block arrives in the node 149 just above. Again node 149 has its own SRC node address stored in itself, which due to the global addressing scheme is known a priori and is 011111, as tabulated in the SRC column at the third column from left in Table III. Node 149 now executes the routing operation and it is seen that destination address 010010 no longer differs from SRC in the highest-order bit pair, but does differ from SRC in its next-highest-order bit pair which is 00. Accordingly, the 00 bit pair from destination address DST is tabulated in the third column entry in the row marked PORT, and node 149 (011111) transfers the data block out of its own port designated 00. Since this is the port for transmission to the upper-left direction, the data block passes in the direction of arrow 150, and reaches the node with SRC address 011100 (upper-left node of unit 134). Comparing the fourth column SRC address with DST in Table III, it is apparent that the high-order bit pairs 01 are still the same and the next-highest-order bit pairs 11 and 00 are still different. Accordingly 00 is again tabulated in the row PORT in the fourth column, and the data block is sent to the upper-left out the 00 port to the node having address 010011 (lower-right node in unit 131). This latest node also has its own SRC node address 010011 stored in itself as tabulated in the fifth column of the SRC table portion of Table III. This node executes the routing operation and it is seen that both high-order bit pairs are 01, both next-highest-order bit pairs are now identical and are 00, but the low-order bit pairs are different—11 and 10. These are the bit pairs of highest order which are different, now. Accordingly, the 10 bit pair from address DST is selected and tabulated in the fifth column of row PORT, and the lower-right node of unit 131 transfers the data block out of its 10 port. This sends the data block to the next node in the lower-left portion of unit 131 which coincidentally is the destination node 010010. This destination node again executes the routing operation now with its own address 010010 as SRC as shown in the sixth column of Table III. All bit pairs match with the destination address DST carried by the data block, so node 010010 keeps the data block which has now reached its destination node, as shown by the entry RCVD in the sixth column of row PORT of Table III.

It will be noticed in the PORT row of Table III that PORT takes on values the same as those in successively lower-order bits in the column DST as the data block is routed successively closer to its destination and is finally received.

In a second example of the operation of the routing operation, a data block originates at node 110100 of FIG. 3 and is to be sent to destination node 101001. Explanatory Table IV is arranged in the same manner as Table III but for this second example. The columns from left to right show the addresses SRC of the nodes through which the data block passes on its way to this different destination DST, as shown by the arrows on FIG. 3 therebetween. It should be clear that as each node performs the routing operation and finds the port designations listed in the row PORT from left to right, the designation 10 in each of the first four columns of the row PORT are derived from the highest-order 10 address portion of destination address DST. Then when the routing has succeeded in transferring the data block into the group including network unit 114, then the routing operation begins deriving port designations of 10 from the next-highest-order address portion 10 of address DST. As in Table III, the row PORT in Table IV takes on values which are the same as those in successively lower-order bit pairs in the column DST as the data block is routed successively closer to and finally reaches its destination DST at node 101001.

In an advantageous feature of the routing operation, no calculations are required to determine the address along the way as a data block is transferred from node to node, since transmission from the designated PORT sends the data automatically to the node having the needed node address SRC already stored therein.

The connection strategy used in the preferred embodiment also interestingly permits determination at a glance of the designation ADR of the port in the adjacent node connected to the port designated PORT of the node SRC from which a data block is being sent. The algorithm for finding ADR from PORT and SRC is based on the principle that the ADR port designation of the port in the adjacent node is the lowest-order digit (coded as a bit-pair when P=4) in the sending node address SRC which is different from the designation PORT of the port in the sending node SRC from which the data block is being sent. The algorithm is suitably implemented by the following sequence of steps:

1. Set index I equal to recursion value R.
2. Test whether SRC(I) is the same as PORT. If Yes, go to paragraph 3; if No, go to paragraph 4.
3. Decrement index I by 1. Go to paragraph 2.
4. The port designation ADR is equal to SRC(I).

For the example illustrated in FIG. 6B wherein SRC is 110100 and the port from which the data block is to be sent is 01, the lowest-order bit-pair in SRC which is different from 01 is the last two bits 00. Accordingly, the port in the next node to which the data block must be being sent is port having designation ADR=00. This prediction corresponds with inspection of FIG. 3 and to the entry made in Example Table III first column, row ADR. The reader can use the columns in Tables III and IV as additional examples for illustrating the determination of ADR.

In the second column of Table III and referring to FIG. 3, the data block is being sent along intergroup connection 153 from node 110101 from PORT 01. Now the lowest-order bit pair in SRC=110101 which is different from 01 is the first two bits 11. Accordingly, the port into which the data block is being sent in the adjacent node has ADR=11, as is readily seen on FIG. 3 and the second column of Table III. Generally speaking, when the bit-pair in SRC which is different from PORT is other than the very last bit-pair in SRC, this signifies that a data block is crossing to another unit, and more specifically to another cluster at the level of recursion indicated by the position of the bit-pair in SRC which is different.

In a still further interesting feature of the connection strategy, the nodal address of the adjacent node SRC' connected to the port designated PORT of the node SRC can be readily generated when desired. It will be understood that in the preferred embodiment no algorithm for this is needed or used, because each node has stored in itself its nodal address. However, the algorithm for the nodal address of the adjacent node SRC' is not overly complicated and is disclosed here for completeness, and for the convenience of the skilled worker in preparing other embodiments and for simulating networks of the present invention.

The nodal address SRC' of the adjacent node to which a data block is sent from node SRC from the port designated PORT is found by first finding the port designation ADR into which the data block is provided on node SRC'. ADR is found by the algorithm just disclosed hereinabove. Then the nodal address SRC' is found by an additional algorithm based on the principle that SRC'(I)=PORT at the value of index I at which SRC(I) was first found different from PORT in the foregoing ADR algorithm. Then all bit-pairs (or more generally, all binary-coded base-P digits) in SRC' having a lower index I (higher level of recursion) are set the same as the corresponding bit-pairs in SRC. All bit-pairs in SRC' having a higher index I (lower level of recursion) are each set to the identical value being ADR.

For the example illustrated in FIG. 6B wherein SRC is 110100 and the port from which the data block is to be sent is 01, ADR is 00 as shown in column one of Table III, wherein PORT of 01 was found different from SRC at I=3, the last bit-pair. Accordingly, SRC' must be 01, the same as PORT, in the last bit-pair. The higher-order bit-pairs are set the same in SRC' as in SRC, so that SRC' is found to be 110101. This is just what the adjacent node address is from inspection of FIG. 3 and as entered in the second column of Table III.

When the data block is sent from the latest node 110101, it leaves by PORT 01 as shown in the second column of Table III. and enters ADR port 11 of the adjacent node. Now SRC is 110101 and a new SRC' is to be found. Since ADR was found from the first bit-pair, I=1, of SRC, the adjacent node address must be the same as PORT at the first bit-pair, so that the first bit-pair of SRC' is set to be 01. There are no higher-order bit-pairs to set the same as SRC. All the lower-order bit-pairs I=2,3 are set to the identical value being 11, which is the value of ADR. The computation yields an adjacent nodal address SRC'=011111, which corresponds to inspection of FIG. 3 and the entry for SRC in the third column of Table III. Tables III and IV can be consulted for further examples illustrating the calculation of the adjacent nodal address.

Turning now to the subject of the data blocks being transferred, it is observed at the outset that the system designer has considerable latitude in defining the manner in which the information to be routed and transferred through the system will be regarded. As but one example, the information is suitably divided up into data blocks, each having a length in bytes of any length up to a maximum number of bytes arbitrarily set.

An example format for the data blocks includes in order the following bytes:

1. Destination mini- or micro- processor unit (MPU) nodal address and port (DSTMPU). 1 byte.

2. Number of bytes in this data block (COUNT). 1 byte.

3. Source MPU originating this data block, by nodal address and port (SRCMPU). 1 byte.

4. User program identifier (PROGID). 1 byte.

5. User program code for deciphering data in this block (PCODE). 1 byte.

6. Actual bytes of information (INFO1, INFO2, INFO3, . . . ) Remaining bytes in block.

DSTMPU in FIG. 6B is shown the same as the destination node address DST. Where each node has more than one processor, DSTMPU is provided with additional bits (not shown) when it is desired to identify a destination processor within the destination node.

FIG. 6A shows a flowchart of a routine for routing a data block residing in a node having address SRC. The routine commences at BEGIN 301. At step 302 an index I is set to zero, and then at step 304 incremented by one (1). At step 305, it is recalled that the routing operation should select the port having a port designation being the highest-order bit-pair in the destination address DSTMPU byte which is different from the corresponding bit pair in the address SRC of the node from the transfer is being made. Accordingly, at step 305 a test is made to determine whether the node SRC address portion numbered I in FIG. 6B, or SRC(I), is identical with the destination DSTMPU byte portion numbered I in FIG. 6B, or DSTMPU(I). For example, in FIG. 6B when I is 1, address portion 381 being 11 is compared at step 305 with address portion 391 being 01. They are not identical. In this example, and whenever the address portions are not identical, the program proceeds to branch to step 306, where the port designation PORT is set equal to the Ith address portion of the destination address DSTMPU of the data block. In this example, then, the variable PORT is set to 01, since this is the contents of address portion 391, which is the highest-order address portion in DSTMPU which is not identical with the corresponding address portion in SRC.

If the corresponding bit-pairs are found to be identical at step 305, the routine loops back to step 304 where index is incremented, and the test is repeated until the highest-order pair of bits is found which are different in the source and destination addresses.

If the source and destination addresses are identical, the index I becomes equal to the level of recursion R, here 3, and the test at step 303 branches to step 327 for disposal of the data block in the local node in a conventional manner, since the data block has reached its destination. The operations end at RETURN 337.

When the data block is to be transferred from the node, the port designation PORT is available at step 306. In nodes constructed so as to be able to send the data block as soon as the port designation is available, control passes directly to step 328 for updating communication queues conventionally and transferring the data block out of the local node from the designated port. In other nodes which send the data by using the adjacent port designation ADR, control passes to step 309.

At step 309 the index I is set to the network level of recursion R, so that, for example, the index I points to bit-pair 383 in FIG. 6B. Then at step 310, a test is made to determine whether the just-mentioned bit-pair, SRC(I), is identical to the contents of PORT. If there is identity, the index I is decremented by one at step 311, and the test at step 310 is made with a successively higher-order bit-pair (lower value of index I) until a value of a bit-pair in SRC(I) is found which is different from PORT. Then the program branches to step 312 where the adjacent port designation ADR is set equal to SRC(I) just found. Finally, control passes to step 328 where queuing operations of conventional type are performed and the data block is actually transferred to the adjacent node, whence RETURN 338 is reached.

Figure 8:
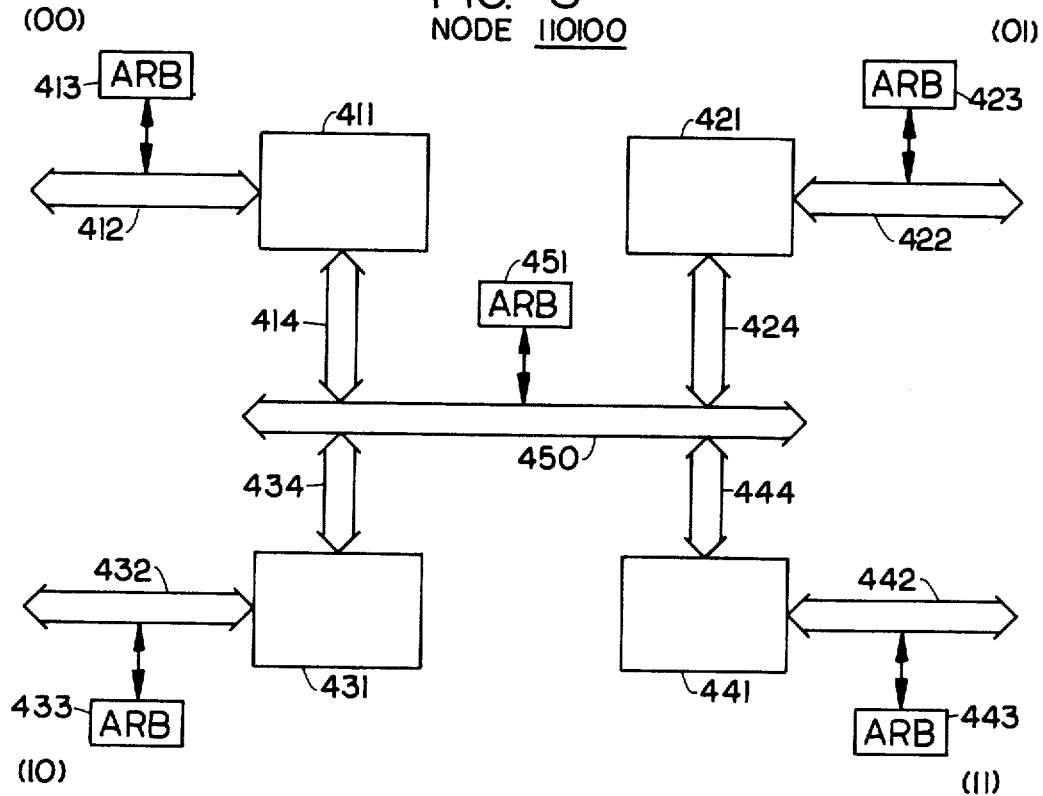
FIG. 8 is an electrical block diagram of the circuits and buses in a typical one of the identical nodes in the inventive network of FIG. 3, each node being an inventive combination.

FIG. 8 shows one example of a node design of inventive type for node 110100 of FIG. 3, this node being but one of the 64 identical four-port nodes used in network 100 of FIG. 3. The node of FIG. 8 is also contemplated as one of the 16 identical four-port nodes used in network 1 of FIG. 1. It is to be understood, of course, that alternative node designs can also be used to implement each node.

Node 110100 of FIG. 8 includes four identical processing assemblies 411, 421, 431, and 441. Each processing assembly is connected to a common intranodal bus 450 by bus connection portions 414, 424, 434, and 444. Each processing assembly has a communication channel for extranodal communication designated 412, 422, 432, and 442 respectively. Each communication channel is intended for direct connection to a respective port of the four ports of node 110100 and to at most one port of one other node. Port designations 00, 01, 10, and 11 are indicated on FIG. 8, according to the port designation convention disclosed herein.

Memory-oriented microcomputers can encounter a disadvantageous operating condition known as deadlock when used with other microcomputers unless the system is designed to prevent the same. For instance, if each processor simultaneously requests an access to an adjoining memory and then waits for its request to be granted, the system must be so designed as to avoid deadlock.

In issuing a memory request, a processor activates its address, data and control lines. These lines are tied to a shared memory, which is "locked up" while the signals are active. A processor must be disconnected from its shared memory for an adjoining processor to gain access; yet, a processor cannot yield the memory while it is "trapped" in a wait state. This paradox results in the potential for a deadlocked condition when conventional microprocessors are used as the processing elements.

Figure 9:
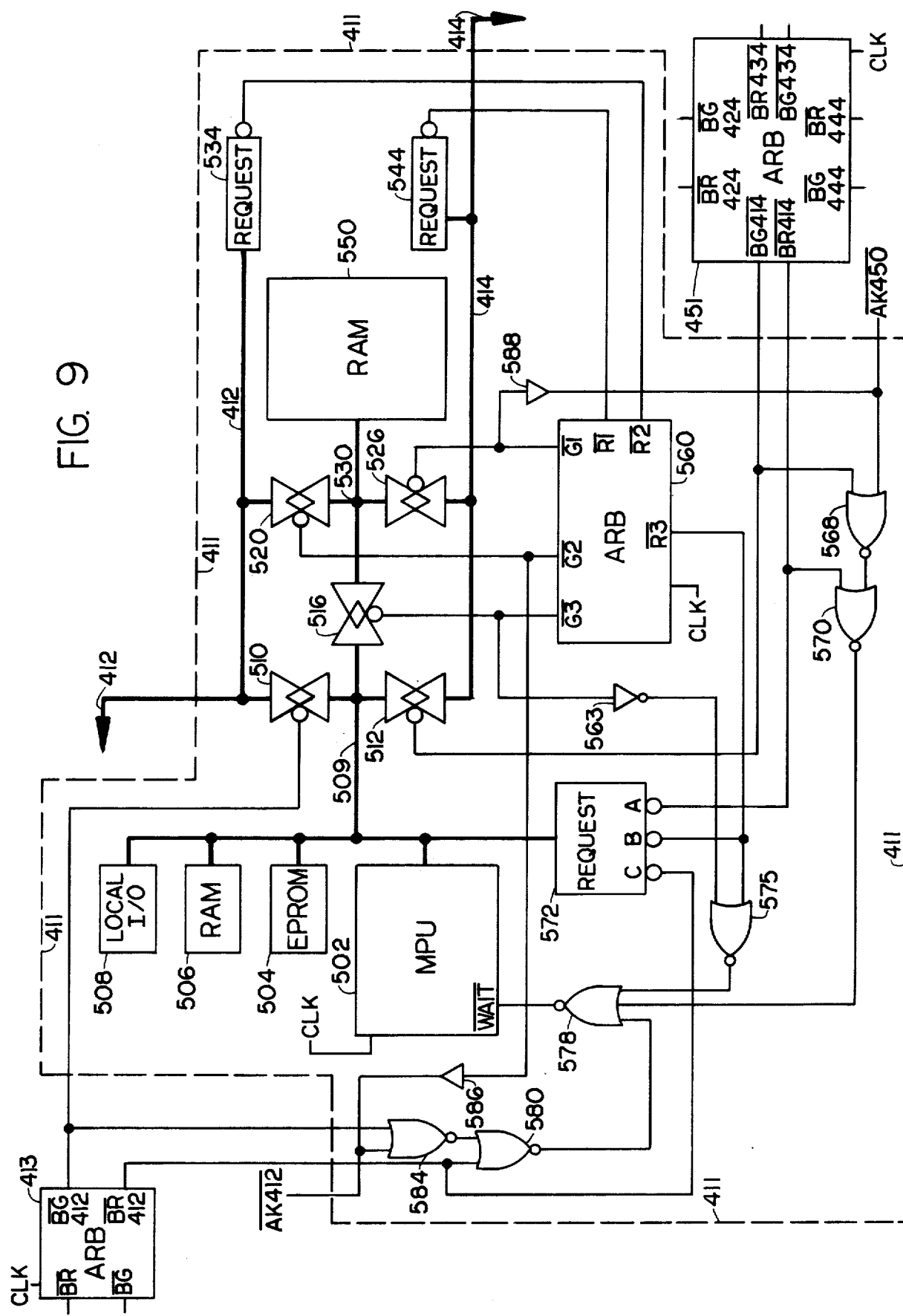
FIG. 9 is a more detailed electrical circuit diagram of an inventive circuit implemented a multiplicity of times to form the node of FIG. 8.

The deadlock problem is solved by the addition of a partition between each processor and its shared memory areas. Such partitions, described in more detail in connection with FIG. 9, are implemented like memory-bus interfaces—using open collector or three-state devices. This allows a processor to be disconnected from its shared memory until its own external requests are granted. Thus, other processors with higher priorities can access the shared memories of their lower priority neighbors, if a circuit, familiar to the art, known as an arbitration circuit, or arbiter, is used to prevent ongoing cycles from being disrupted. Simultaneous requests by processors in the absence of means of arbitration are known as contention, and arbitration is a means of eliminating contention among processors for the same resources.

In order to eliminate contention by the processing assemblies 411, 421, 431, and 441 for the use of the intranodal bus 450, a four-port arbiter circuit 451 is provided, as shown in FIG. 8. Within each processing assembly 411, 421, 431, and 441 there is provided a three-port arbiter circuit (arbiter 560 of FIG. 9) to eliminate contention between requests asserted on shared memory in each processing assembly by a local microprocessor, by an external microprocessor on an extranodal bus connected to the processing assembly, and by another microprocessor along the common bus 450. In addition, two-port arbiter circuits 413, 423, 433, and 443 are respectively provided to eliminate contention between microcomputers at both ends of buses 412, 422, 432, and 442 in extranodal or internodal communications.

In the example node of FIG. 8 each processing assembly 411, 421, 431, and 441 is provided with a microcomputer including a microprocessor and memory. Thus, the node is a multi-microcomputer in its own right. Each processing assembly is capable of carrying out data processing, or "number-crunching" according to user programs being executed therein. In addition, when appropriate, the microcomputers in each processing assembly cooperate in parallel processing, data block transfers and multi-microcomputer operations of a variety of types made possible by the inventive networks for synergistically accomplishing computer tasks of substantial magnitude at reasonable cost.

The example node of FIG. 8 can be imagined in some aspects of its operation by a few examples. First, suppose that the microcomputer in processing assembly 411 is provided with a program and all the data needed to execute the program. Then the program is executed locally and no data block transfers necessarily take place. Second, suppose that the microcomputer in processing assembly 411 is executing part of a large program in parallel with the microcomputer in processing assembly 431, the results from assembly 411 being needed at 431 to complete the operations of 431. A data block transfer is needed between assembly 411 and 431. The microprocessor in assembly 411 requests arbiter 451 to grant it the use of bus 450, which arbiter 451 eventually does. Next, the three-port arbiter inside assembly 431 is requested to grant the use of shared memory inside assembly 431. When the shared memory request is granted, the microprocessor in assembly 411 executes a block move instruction or sequence and moves the data into assembly 431.

In a third example, suppose that the microcomputer in processing assembly 411 is originating a data block for use outside the node and that the data block must be transmitted out port 10 of the node. The operation is the same as in the second example insofar as the data block is moved into assembly 431. Assembly 431 adds the data block to a queue in its shared memory. Then, in addition, assembly 431 executes its own copy of the data routing and transfer routine of FIG. 6A, and requests two-port arbiter 433 to grant it the use of bus 432. When the bus 432 is granted, assembly 431 waits until the three-port arbiter in a processing assembly of an adjacent node (not shown) to which bus 432 is connected, grants its own shared memory and the data block is transferred.

In a fourth example, suppose that a data block is originated outside of node 110100, enters along bus 412 and transits the node, exiting along bus 442. A microprocessor (not shown) in a node processing assembly adjacent to the FIG. 8 node and connected to bus 412 requests bus 412 from arbiter 413, which eventually grants bus 412, then requests the shared memory of processing assembly 411 from the three-port arbiter in assembly 411, which eventually grants the shared memory. The data block is now transferred and put in a receive queue in the shared memory in assembly 411. The microcomputer in processing assembly 411 subsequently executes the operations of FIG. 6A and sees that it calls for transferring the data block into the shared memory in processing assembly 441 at the hardware address corresponding to a port designation of 11. Now the microprocessor in assembly 411 requests bus 450 from four-port arbiter 451 and when granted bus 450, requests the shared memory in processing assembly 441 from the three-port arbiter therein and eventually is able to transfer the data block into a transmit queue in the shared memory of assembly 441. The microcomputer in assembly 441 executes the routine of FIG. 6A, and since the routine is being executed in the same node 110100, recognizes that the data block is to be transmitted from the port designated 11. In assembly 441, the routine of FIG. 6A finds an address corresponding to port 11 that in fact will send the data block out along bus 442. Then the microprocessor in assembly 441 requests the arbiter 443 to grant it bus 442 and eventually receives bus 442; and then the arbiter (not shown) in a processing assembly of the adjacent node 110111 of FIG. 7 connected to bus 442 is requested to grant the shared memory there. The shared memory is eventually granted, and the data block exits node 110100 via bus 442.

In an interesting feature of the FIG. 8 node, as many as five distinct data block transfers can be occurring simultaneously along the buses 412, 422, 432, 442, and 450. Thus, the node is a highly flexible and useful system component for multi-microprocessor networks such as those of FIGS. 1 through 5.

The design of the FIG. 8 node is readily changed in the number of ports. For example, the network 60 of FIG. 4 accommodates nodes of the type of FIG. 8 suitably deleting processing assembly 441, bus 442 and arbiter 443, to make it a three port node. The network 200 of FIG. 5 accommodates nodes of the type of FIG. 8 provided an additional processing assembly, extranodal bus, two-port arbiter group are added on bus 450 and arbiter 451 is changed to a five-port arbiter. In this manner, as few or as many ports as are required for the system at hand are readily provided.

FIG. 9 is an electrical block diagram of an example of one of the four identical processing assemblies, e.g. 411, and its manner of electrical connection with bus 412 arbiter 413 and bus 450 arbiter 451 of FIG. 8. It is to be noted that part of FIG. 9 uses heavy line technique to indicate buses, including the data lines, address lines, and control lines. Synchronization circuitry shown in FIG. 9 is associated with the synchronization lines Bus Request ($\overline{BR}$), Bus Grant ($\overline{BG}$), and Bus Acknowledge ($\overline{AK}$) in each of the buses, e.g. bus 412 and 414, broken out for greater detail. In each bus there need be but one Acknowledge line, and by contrast there is provided a Bus Request and Bus Grant pair for each arbiter port (2 pairs on bus 412 arbiter 413, 4 pairs on bus 450 arbiter 451).

All of the arbiter circuits 413, 451, and 560 are shown as circuit blocks only, since their detail is familar to the skilled worker. The Requests to each arbiter are set by Request circuits 534 and 544, for buses 412 and 414 respectively and by Request circuit 572 for MPU 502. Each Request circuit responds to addresses asserted within the shared memory address space to provide corresponding request signals, e.g. by means of a decoder circuit.

Much of the detail associated with microcomputer circuits is already familiar to the person skilled in the art and has been available for several years. Accordingly, much of such detail has been omitted in the drawing for the purpose of clarifying the principles and manner of operation of the present invention without sacrificing completeness in the disclosure thereof. A helpful textbook survey of some of the background of microcomputer hardware design is found in *An Introduction to Microcomputers* in two volumes by A. Osborne, Adam Osborne & Associates, Inc., P.O. Box 2036, Berkeley, Calif. 94702, 1976. In one example of several commercially available microprocessors, the Zilog Z80 microprocessor and its interfacing are discussed at Vol. II, Chapter 5 of the textbook.

Referring again to FIG. 9, processing assembly 411 has MPU 502, erasable programmable read-only-memory (EPROM) 504, random-access memory (RAM) 506 and local input-output equipment 508 (I/O) of familiar type connected together on a local bus 509 all in a manner familiar to the art. Chip-enable circuitry, clock circuitry, and all other details typical of the small microcomputer system of any familiar type are omitted for clarity. MPU 502 suitably has an associated 4 MHz. square wave clock with 0–5 volt voltage swing driving a Zilog Z80A microprocessor chip. EPROM 504 is illustratively at least one 2716 unit, a 2K (K = 1024) byte (8 bits per byte) nonvolatile device, which holds a MPU 502 monitor program and software for performing routing operations in accordance with FIG. 6A on data blocks. RAM 506 has sufficient capacity for the computing applications contemplated for the system, illustratively including at least one 4118 unit, a 1K byte read-write device, which is used for storage of variables and programs loaded by the monitor from shared memory 550 or optional local I/O 508. Optional local I/O 508 includes a keyboard-CRT terminal and floppy disk.

MPU 502 has partitioned access to internodal bus 412 via transceiver 510, and to intranodal bus 414 (connecting to common bus 450) via transceiver 512. Shared memory 550, illustratively including at least one 4118 unit of RAM, is accessed from either bus 412 or 414 by transceiver 520 or 526 respectively. MPU 502 accesses RAM 550 through transceiver 516. Transceivers 510, 512, 516, 520, and 526 are any suitable partitioning circuits such as one including tri-state device chips such as the 8T28 sufficient in number to provide bidirectional buffering as needed to all address lines, all data lines, and all control lines including Read ($\overline{RD}$), Write ($\overline{WR}$), and Memory Request ($\overline{MREQ}$).

It is contemplated inthe present FIG. 9 circuit that blocks of data being transferred through a node such as 110100 of FIG. 8 are stored in the shared memory 550 of a given processing assembly, such as 411, of the node. Each processing assembly such as 411 in each node suitably has stored in EPROM 504 a routing program as discussed in connection with FIG. 6A, the local node address SRC, and the port designation of the port with which the processing assembly is associated. MPU 502 accomplishes local computing which creates data blocks and causes each block of data to be transferred toward its destination node.

The transceivers 510, 512, 516, 520, and 526 permit several MPUs and memories to share buses 509, 530, 412, and 414. Conceptually, they are used to partition memory areas, so that independent operations can be performed simultaneously in the memory areas on either side of a partition. For example, the local MPU 502 is able to execute a program contained in its local EPROM 504 or RAM 506, while an external MPU executes a different program contained in its own local memory calling for access to RAM 550. The two memory areas 506 and 550 can be used simultaneously because the transceivers partition the memory buses into the separate physical areas or portions 509, 412, 414, and 530.

In one example of operation, the local MPU 502 is able to obtain exclusive access to the shared memory 550 by communicating to Request circuit 572 so as to set output "B", a Request $\overline{R3}$ to arbiter 560, to enable transceiver 516, connecting MPU 502 to shared RAM 550 and conceptually connecting the memory area of bus 509 to that of bus portion 530.

The access can only be granted if no other MPU corresponding to MPU 502 in processor assemblies 421, 431, and 441, or an external node, is using the shared memory 550 at that time. If an ongoing memory cycle of such other MPU is in progress at the time of the MPU 502 request, then the new request cannot be granted until the ongoing memory cycle is finished.

MPU 502 can obtain access to bus 412 by appropriately communicating to Request circuit 572 so as to set output "C". Then output C is conducted to arbiter 413, eventually enabling transceiver 510 and connecting MPU 502 to bus 412. Similarly, MPU 502 can obtain access to bus 414 by appropriately communicating to Request circuit 572 so as to set output "A". Then output A is conducted to arbiter 451, eventually enabling transceiver 512 and connecting MPU 502 to bus 414. Once access to a respective bus 412 or 414 has been achieved (condition called bus mastery where MPU 502 is then called the bus master) the MPU further waits until the three-port arbiter analogous to arbiter 560 but located in the adjacent processing assembly in the local node grants access to its shared memory analogous to RAM 550.

When use of RAM 550 is sought by another MPU elsewhere in the same node along intranodal bus 450-414, the other MPU communicates to Request circuit 544 which sets a low-active request signal $\overline{R1}$ (first-line Request) to arbiter 560. When arbiter 560 can grant the request, a low-active grant signal $\overline{G1}$ (first-line Grant) is provided to transceiver 526. Then transceiver 526 provides a path from bus 450-414 along bus segment 530 to RAM 550, permitting the other MPU to use memory 550. When the Request $\overline{R1}$ is dropped or turned off by the other MPU, each arbiter involved returns its grant signal to high-inactive status and transceiver 526 is disabled.

Similarly, when the use of RAM 550 is sought by another MPU outside the node along bus 412, then Request circuit 534 is made to set a low-active request signal $\overline{R2}$ (second-line Request) to arbiter 560. When arbiter 560 can grant the request, a low-active grant signal $\overline{G2}$ (second-line Grant) is provided to transceiver 520. Then transceiver 520 provides a path from bus 412 along bus segment 530 to RAM 550. When the Request $\overline{R2}$ is dropped or turned off by the other MPU, each arbiter involved returns its grant signal to high-inactive status and transceiver 520 is disabled.

Additional discussion of the synchronization logic of FIG. 9 now follows. Suppose transceiver 516 is enabled by the signal $\overline{G3}$ (third line Grant) from the arbiter 560, which indicates that the local MPU 502 has been granted access to the RAM 550. When signal output "B" from Request circuit 572 falls low and until signal $\overline{G3}$ fell low in response to the Request, NOR-gate 575 was provided with an input low from Request "B" and Grant inverter 563, making NOR-gate 575 output high.

The NOR-gate 575 output high drives NOR-gate 578 output low causing MPU 502 to wait. When signal $\overline{G3}$ falls low, inverter 563 goes high, NOR-gate 575 goes low and NOR-gate 578 goes high. This operation occurs because when the outputs "A" and "C" of Request circuit 572 are high at this time, the outputs of NOR-gates 570 and 580 fed to NOR-gate 578 must also be low. Accordingly, the MPU 502 $\overline{WAIT}$ signal is driven high through NOR-gate 578, thereby permitting MPU 502 to do operations in shared memory 550 as soon as the memory request "B" to $\overline{R3}$ is granted by $\overline{G3}$ falling low.

When MPU 502 requests access to a shared memory elsewhere in the node through intranodal bus 414-450, Request circuit 572 sets its Request at output "A" as a low-active signal. High-inactive signals remain at outputs 572B and 572C at this time. The low-active signal at output 572A asserts bus-request-414 ($\overline{BR414}$) of intranodal bus arbiter circuit 451. When bus 414-450 becomes available, the arbiter 451 grants the Request and makes output $\overline{BG414}$ (Bus-Grant 414) low-active. This output enables transceiver 512 thereby connecting MPU 502 to bus 414 until the Request 572A is turned off by MPU 502 later. When Request output "A" goes low NOR-gate 570 becomes qualified. As long as output $\overline{BG414}$ is high-inactive and until the Grant is made by $\overline{BG414}$ falling low, NOR-gate 568 is driven low, producing an output high from NOR-gate 570 and an output low from NOR-gate 578, causing MPU 502 to wait. The $\overline{WAIT}$ line is also driven low by a circuit through NOR-gates 568 and 570 until an acknowledgment of access to shared memory elsewhere in the node is received on line $\overline{AK450}$. This occurs because NOR-gate 568 does not go high until both $\overline{BG114}$ and $\overline{AK450}$ are low.

The Acknowledgement occurs by the following process. An MPU 502 command set Request 572 output "A" which was granted by arbiter 451, enabling transceiver 512. The transceiver 512, being enabled, permits the same MPU 502 command to pass out from bus 509 along bus 414-450 to the requested port in the same node where it sets the Request circuit analogous to circuit 544 in the port. That Request circuit makes an $\overline{R1}$ Request to the arbiter circuit analogous to arbiter 560 in the port. When the three-port arbiter in the distant port grants the Request its $\overline{G1}$ grant signal falls low, passing through a buffer analogous to buffer 588, causing line $\overline{AK450}$ to fall low. Since line $\overline{AK450}$ connects all ports in the same node, the Acknowledgment is conducted back to the local port where it is received by NOR-gate 568. NOR-gates 568, 570, and 578 cause the MPU 502 $\overline{WAIT}$ line to go high, permitting the MPU 502 to proceed. NOR-gate 580 does not interfere since it has an output low because output "C" of Request circuit 572 is high-inactive at this time.

Port-to-port accessing is essentially the same process whether the port is elsewhere in the local node or in the adjacent node. For instance, when MPU 502 requests access to a shared memory in the adjacent port of another node through internodal bus 412, Request circuit 572 sets its output "C" as a low-active signal. High-inactive signals remain at outputs 572A and 572B at this time. The low-active output "C" asserts bus-request-412 ($\overline{BR412}$) of internodal bus arbiter 413. When bus 412 becomes available, the arbiter 413 grants the Request and makes output $\overline{BG412}$ (Bus-Grant 412) low-active, enabling transceiver 510. When output "C" goes low NOR-gate 580 becomes qualified. As long as output BG412 is high-inactive and until the Grant is made by BG412 falling low, NOR-gate 584 is driven low, producing an output high from NOR-gate 580 and an output low from NOR-gate 578, causing MPU 502 to wait.

node. Another example address 000--- stands for an address in the space at port 00 set aside for communications coming into port 00 directly from an adjacent node.

TABLE V

DECODER INPUT ADDRESS TABLE

| PORT | LOCAL DECODER OUTPUTS ACTIVE | | | EXTERNAL BUS DECODER OUTPUT ACTIVE | COMMON BUS DECODER OUTPUT ACTIVE |
| --- | --- | --- | --- | --- | --- |
| | A | B | C (1 of 3) | | |
| 00 | 011- - - | 001- - - | 010- - - | 000- - - | 001- - - |
|    | 101- - - | 000- - - | 100- - - |          |          |
|    | 111- - - |          | 110- - - |          |          |
| 01 | 001- - - | 011- - - | 000- - - | 010- - - | 011- - - |
|    | 101- - - | 010- - - | 100- - - |          |          |
|    | 111- - - |          | 110- - - |          |          |
| 10 | 001- - - | 101- - - | 000- - - | 100- - - | 101- - - |
|    | 011- - - | 110- - - | 010- - - |          |          |
|    | 111- - - |          | 110- - - |          |          |
| 11 | 001- - - | 111- - - | 000- - - | 110- - - | 111- - - |
|    | 011- - - | 110- - - | 010- - - |          |          |
|    | 101- - - |          | 100- - - |          |          |

The $\overline{\text{WAIT}}$ line is also driven low by a circuit through NOR-gates 584 and 580 until an acknowledgement of access to shared memory elsewhere in the adjacent node is received on line $\overline{\text{AK412}}$. This occurs because NOR-gate 584 does not go high until both $\overline{\text{BG412}}$ and $\overline{\text{AK412}}$ are low. The Acknowledgment from the adjacent node occurs by the following process. An MPU 502 command set Request 572C which was granted by arbiter 413, enabling transceiver 510. The transceiver 510, being enabled, permits the same command to pass out from bus 509 along bus 412 to the requested port in the adjacent node where it is decoded by the Request circuit analogous to circuit 534 in the port. That Request circuit makes an $\overline{\text{R2}}$ request to the arbiter circuit analogous to arbiter 560 in the port. When the three-port arbiter in the distant port grants the Request, its $\overline{\text{G2}}$ grant signal falls low, passing through a buffer analogous to buffer 586 causing line $\overline{\text{AK412}}$ to fall low. Since line AK412 connects the local port with the distant port, the Acknowledgment is communicated back to the local port where it is received by NOR-gate 584. NOR-gates 584,580, and 578 cause the MPU 502 $\overline{\text{WAIT}}$ line to go high, permitting the MPU 502 to proceed. NOR-gate 570 does not interfere since it has an output low because output 572A is high-inactive at this time.

An example of a scheme for addressing in each node of the inventive networks in the specific case of four-port nodes, is illustrated by Table V, the Decoder Input Address Table.

In each node, such as node 110100 of FIG. 8, the addresses of the spaces in shared memory 550 of FIG. 9 are illustratively assigned so as to include a prefix having a bit-pair corresponding to the port identification of the port in which the shared memory is located, followed by a bit corresponding to the identification one (1) for space set aside for communications coming in from elsewhere in the same node and zero (0) for space set aside for communications coming directly in from an adjacent node. The hyphens "---" following the prefixes listed in Table V indicate an arbitrary number of additional address bits within each memory space. Each decoder in a Request circuit is made so as to respond to assertion of any address which has the proper prefix as set forth in Table V.

Accordingly, as used in Table V, the address 011--- means an address in the space at port 01 set aside for communications coming in from elsewhere in the same The principles upon which Table V is based are as follows. The local Request circuit 572 common bus request output "A" is low-active whenever the local MPU 502 asserts an address in the one-space in another port. The local Request circuit 572 shared memory request output called "B" is low-active whenever the local MPU 502 asserts an address in either the zero-space or the one-space of its own port. The local Request circuit 572 external bus request output "C" is low-active whenever the local MPU 502 asserts an address in the zero-space in another port. Because of the wiring in FIG. 9, the assertion of such "C" address, even though it exists in the same node, does not result in grant of shared memory in the same node, because the external bus 412 and not the intranodal common bus 450 is granted to such Request. Likewise, the assertion of an "A" address, even though it may correspond to an address in a port of an adjacent node connected to the local port, does not result in grant of shared memory in the adjacent node, because the intranodal common bus 450, and not the external bus 412, is granted to such Request. A notation "(1 of 3)" is made for the "C" output on Table V to indicate that is contemplated that depending on the ADR designation of the adjacent port only one of the three tabulated designations of address space will be asserted by the local MPU in its external communications.

Again referring to Table V, the external bus Request circuit 534 output is set low by asserting on the external bus 412 an address having a prefix which designates the port to which the external bus is connected, followed by a zero for the zero-space for communications coming in directly from the adjacent node. Also, the common bus Request circuit 544 output is set low by asserting on the common bus 450 an address having a prefix which designates the local port in which the Request circuit 544 is found, followed by a one for the one-space for communications coming in from elsewhere in the same node.

From Table V it is observed that the address mapping provides illustratively for nonoverlapping addresses for each of the spaces in the same node, but for identical address allocations for all nodes in the inventive networks. The Request circuits working together with the arbiter circuits keep intranodal transfers from being confused with node-to-node transfers. The identical address allocations assist the nodes in working together, since output "C" in one node causes an external, or internodal, bus grant, and the same address prefix matches the needs of the external bus decoder in the Request circuit 534 in the next or adjacent node. This process is assisted also because the routing operations of FIG. 6A can and do determine the port designation of the port to which each block of information is to be routed. In an additional helpful consideration, each adjacent port can perforce never have a port designation identical to that of a given local port, due to the port designation scheme described herein as one illustration. Accordingly, it turns out not to be a problem that the "C" output of the local Request circuit 572 is not responsive to a port designation identical to that of the local port in an asserted address.

Turning now to the subject of semaphores, queuing operations are protected by means of a semaphore for each shared memory. The semaphore has the effect of logically locking the data buffers of the memory so that block moves can be accomplished without interference from other data transfer operations that might overwrite the buffers. Arbitration is used on each and every memory operation to eliminate contention for a single resource such as the shared memory 550. Arbitration is a low-level hardware locking mechanism, while queuing and semaphore operations are high-level software locking mechanisms. The semaphore operation has the attribute that the first process or processor to execute the semaphore operation will succeed, gaining permission to continue, while other processors will not be permitted until the semaphore is set again.

The semaphore operation is used to prevent two processes or processors from simultaneously accessing a queuing system, which contains and manages pointers and is provided for queuing operations in a conventional manner. This preserves the queuing system from disruption by independent activity. This is the basis for multi-tasking, resource-sharing and time-sharing in modern operating systems except for single-processor single-user systems.

Thus, semaphore logic (not shown in FIG. 9) allows external processors to synchronize their queuing operations with those of the local processor 502. If one processor attempts a queuing operation while another processor has one in progress, then the queue structure may be disrupted. Consequently, a doctrine of mutual exclusion is followed, so that only one processor is allowed to perform communication queuing at a time.

A Z80 semaphore is implemented with additional logic, not shown, designed in conventional manner. (Larger computers use special test-and-set instructions to implement memory semaphores.) For the present purposes and relative to FIGS. 8 and 9, a semaphore is provided for each shared memory 550 at every port of every node in the network. A semaphore is set by a Write operation, for example, to its port address, and the semaphore flipflop is wired to reset by a Read operation to that address. However, the value of the semaphore can be determined by the same Read operation, as through a data line in the bus on which the Read is performed, before the reset signal is generated.

So, if the semaphore is set, this indicates to the processor which reads it that the communication queuing structure is available for manipulation. If the semaphore is found to be reset at the time of a Read, then the communication queuing structure is temporarily in use, and the processor keeps testing the semaphore until the semaphore is found to be set. The semaphore is always in the reset condition at the termination of a Read cycle, so that a second Read operation without an intervening Write, will find the queuing structure unavailable. When a processor completes its queuing operation, it sets the semaphore by a Write, allowing another processor to proceed.

An illustrative embodiment of the invention has been presented herein. Some remarks are now made in regard to several considerations which can be of interest in a variety of other embodiments of the invention without pretense of being exhaustive.

When data is transferred from one place to another in a computer system, it is actually being transferred from one area of memory to another, regardless of the intervening mechanisms or media. The information can be moved a word at a time, by means of random-access memory operations; it may also be organized into buffers, packets or messages, and transferred by means of communications in bit-oriented formats.

In memory systems, transfers are regarded as involving a certain number of address, data and control signals, which are used in each operating cycle. In the case of communication links, conductors come to mind by which information is transmitted and received with address, data and control information embedded in messages or packets, instead of being expressed as separate signals. In either case, the data is placed in a communication channel along with information to describe the transfer.

In a numerical example, consider a 32-bit computer connected to a bus with 32 data lines, 32 address lines, and ten control lines for bus and memory access. This example bus requires 74 conductors, all of which must participate in the transfer of 32 bits of information in a single cycle. Thus, a transfer of two memory words involves the activation of 148 signals, while a 256 word transfer involves 18,944 signals.

Suppose that the same 32-bit computer is also connected to a high-speed serial communication link, which has the same bandwidth, in bits per second, as the bus. In other words, the link can transfer 32 message bits in the time required for a single bus operation. The link utilizes a protocol and a message format to control the transfers; so, let 100 bits be used for routing and flow control fields. Then the transfer of two memory words requires 164 signals, compared to 148 for the bus, and the message takes over 2.5 times as long to transmit. However, a 256-word transfer would be far more efficient, using only 8,292 communication signals, and about 1% more time.

This example illustrates that memory bus implementations are generally more efficient for short transfers, while serial links are generally preferable for long messages. Both types, called "communication channels" herein are contemplated in applications of the invention. The tradeoffs between them are actually more complicated, both in cost and in speed. For example, it may be inappropriate to assume that communication could have, say, 32 times the clock rate of a bus implemented with the same basic technology. However, the point is that one approach is not inherently superior. The choice depends on the application, which determines the required communication bandwidth.

It is observed that in the embodiments described herein a fixed routing scheme is used, in that a data block located at a given node and intended for a given destination node is routed along a fixed path. In other embodiments, such as those intended to dynamically adapt to node and link failures, it is contemplated that modifications based on the principles of the invention are made, such as using the fixed routing scheme to initialize routing tables in each node. Failures or traffic congestion are then handled by dynamically modifying the tables, to switch communications onto alternate paths, avoiding the trouble spots.

Contemplated applications of the methods herein disclosed include variations involving multiple-destination addressing and quasi-broadcasting from one node. For example, suppose that one node has a data block which is intended for every node in the network. There is no need to send the data block a number of times equal to the number of nodes, or even ports, in the network. The operations are suitably arranged so that the routing and transferring, as in FIG. 6A, cause the same data block to pass from more than one port of the same node in a sufficiently intelligent manner based on the recursive structure of the network so that the same information is not sent to any destination node more than once, and so that all unnecessary transfers in the process are avoided. Other operations suitably involve sending the same information from a given node to every node in a designated unit or group in the network, as when all the nodes are expected to require the information or when it is not known which node of the unit or group is the only one requiring the information. Such operations are programmed in a straightforward manner based on the methods herein disclosed.

Where assymetrical networks are implemented so that a plurality of levels of recursion are implemented in what would otherwise be a single nodal location in the network, the FIG. 6A operations within the single nodal location are simply modified to take account of the extra levels of recursion there.

The system monitor software and hardware details at each node are believed to be sufficiently available to those skilled in the art to require no further elaboration in the interests of conciseness but without sacrificing completeness of disclosure.

In some system applications, it is contemplated that the information called "data blocks" is not only data as the term is frequently used but also pieces of executable coding sometimes known as tasks, and other pieces of computer information of whatever nature. In the multiple computer architecture of the networks discussed herein, the communication system manages input and output queues and moves blocks between source and destination nodes, using packet or message switching for example. The communication system is suitably invoked by user programs as the skilled worker may design, to perform data transfer, perform timekeeping and load balancing functions, using clock interrupts for timekeeping and protection. It is observed that synchronization interrupts are useful in keeping programs from inadvertently being permitted to run indefinitely, tying up a node or port. Thus, system software is suitably invoked at intervals to check and update status and perform communications.

An outline for a procedure for bringing such approach in a network into operation is suggested as follows.

I. Initialize local machine at power-up.
  A. Find memory and I/O resources
  B. Determine identity
  C. Set up communication queues
  D. Initialize clock and I/O devices II. Initialize global machine
  A. Identify self to neighbors and neighbors to self
  B. Synchronize clocks if necessary III. If input devices are available, obtain programs for task decomposition and execution.

IV. If neighbors are free to execute tasks, and some are available, then send some tasks to neighbors, i.e. perform load balancing.

V. If no tasks are available locally then obtain some from neighbors, i.e. perform load balancing.

VI. Execute a task time-slice.

VII. Update status and clocks as appropriate.

VIII. When task is complete, return results to source, or perform appropriate communications.

IX. If task execution exceeds the alloted time, kill the task and report the fact to source, else go to VI.

X. When program completes, i.e. all tasks have reported completion, output results to I/O devices.

XI. If a task failure is reported, abort the program, and report the fact through an I/O device.

XII. Go to III.

In all cases it is to be understood that the hereinabove-described preferred embodiments, arrangements, apparatus, methods, and systems are merely illustrative of a small number of the many possible specific embodiments and methods which can represent applications of the principles of the invention. Numerous and varied other arrangements, embodiments, apparatus, methods and systems can readily be devised in accordance with these principles by those skilled in the art without departing from the spirit and scope of the invention and so that the utility of the invention can be fully realized.

What is claimed is:

1. A network of computing nodes interconnected by a plurality of communication channels, said network being CHARACTERIZED IN THAT said network of computing nodes is organized by said communication channels into units, each unit having at least three computing nodes, each computing node in each unit being directly connected to every other computing node in the same unit by said communication channels from each computing node to every other computing node in the same unit, said network further being organized by said communication channels into at least one group of units, each unit having only one direct connection to each other unit in the same group by way of said communication channels, each group having at least three units, and any one computing node in any one unit in the network having a direct connection to a node in at most one other unit in the network.

2. The network of computing nodes claimed in claim 1 wherein said network is organized by said communication channels into a plurality of groups of said units, each group having only one direct connection to each other group by way of said communication channels.

3. The network of computing nodes claimed in claim 1 wherein every unit has the same number P of computing nodes and every group has the same number, being equal to P, of units.

4. A method of routing computer information comprising the steps of providing a network of computing nodes having ports, said computing nodes being directly connected at said ports by a plurality of communication channels so that said network is organized into units, each computing node in each unit having only one direct connection to each other computing node in the same unit, said network further being organized by said communication channels into at least one group of units, each unit having only one direct connection to each other unit in the same group, any one computing node in any one unit in the network having a direct connection to at most one other unit in the network;

storing in each of said computing nodes a distinct address having address portions including in decreasing order an address portion identifying for each computing node its unit and an address portion identifying each computing node in its unit;

storing in each of said computing nodes an identification of each port of each computing node respectively, said identification of each port being identical with the computing node address portion of the address of a computing node in the same unit to which each port is connected and said identification of each port being identical with the unit address portion of the address of a computing node in a distinct unit to which each port is directly connected;

providing said computer information with an associated destination address being identical to one address stored in one of said computing nodes in the network; and transferring said computer information from one of said computing nodes having an address distinct from said destination address by selecting the port of one of said computing nodes having a port identification identical to the highest order address portion in the destination address which is different from the corresponding address portion of said one computing node and sending said computer information from said port so selected to an adjacent computing node.

5. The method of routing computer information claimed in claim 4 wherein said address storing step includes each said address further having a high-order address portion identifying for each computing node its said group in said network of computing nodes; and said port identification storing step also includes said identification of each port being identical with the group address portion of the address of a said computing node in a distinct group to which said each port is directly connected.

6. The method of routing computer information claimed in claim 4 wherein said method further comprises the step of generating an adjacent port identification of the port of said adjacent computing node to which said computer information is to be sent by obtaining as said adjacent port identification the lowest order address portion in the sending node address which is different from the port identification of the port selected for sending said computer information from said sending node.

7. Apparatus for use in a computing node and transferring digital information comprising first bus means and second bus means; and processing assembly means comprising memory means, digital processor means for generating a first portion of said digital information and asserting bus request signals, arbitration means for producing grant signals in response to bus request signals assertable from said digital processor means and from said first bus means, and partition means for connecting, in response to the grant signals, said memory means and said digital processor means to each other selectively, and for connecting said digital processor means and said second bus means to communicate said first portion of said digital information through said partition means to said second bus means and simultaneously connecting said memory means separately to said first bus means to communicate other digital information therebetween.

8. Apparatus for transferring digital information as claimed in claim 7 wherein said partition means includes means for alternatively connecting said digital processor means to said first bus means and simultaneously connecting said memory separately to said second bus means, said arbitration means further being responsive to requests from said second bus means.

9. Apparatus for transferring digital information as claimed in claim 8 wherein said apparatus further comprises second processing assembly means constructed in the same manner as said first-named processing assembly means, said apparatus having corresponding first bus means and second bus means for said second processing assembly means;

said second bus means for said first processing assembly means being connected to said first bus means for said second processing assembly means to form a bus communications channel;

said arbitration means in said first processing assembly means including bus arbiter means for granting said bus communications channel to only one at a time of said first and second processing assembly means by grant signals to said partition means to said first and second processing assembly means in response to requests assertable by said digital processing means in said first and second processing assembly means.

* * * * *